Jan. 9, 1968   R. D. TRUEBLOOD   3,362,229
TRANSVERSE ANGULAR VELOCITY SENSOR
Filed Jan. 23, 1964   2 Sheets-Sheet 1

INVENTOR.
Richard D. Trueblood
BY
Hugh L. Fisher
ATTORNEY

Jan. 9, 1968   R. D. TRUEBLOOD   3,362,229
TRANSVERSE ANGULAR VELOCITY SENSOR
Filed Jan. 23, 1964   2 Sheets-Sheet 2

INVENTOR.
Richard D. Trueblood
BY
Hugh L. Fisher
ATTORNEY

United States Patent Office 3,362,229
Patented Jan. 9, 1968

3,362,229
TRANSVERSE ANGULAR VELOCITY SENSOR
Richard D. Trueblood, Santa Barbara, Calif., assignor to General Motors Corporation, Detroit, Mich., a corporation of Delaware
Filed Jan. 23, 1964, Ser. No. 339,684
6 Claims. (Cl. 73—505)

This invention relates to a device for measuring angular rate and, more particularly, to such a device for measuring the transverse angular velocity responsible for nutation of a spinning body.

Successful execution of orbital or sub-orbital flights of spin-stabilized vehicles generally requires accurate control over the orientation and direction of the vehicle. In the case of spin-stabilized bodies, attitude control requires a measurement of the direction and magnitude of the angular velocity transverse to the axis of spin. Considering, for example, a body in the shape of a disc spinning about an axis normal to the disc and passing through the center thereof, transverse angular velocity is that velocity component responsible for nutation. The present invention provides a means for sensing to a high degree of accuracy the nutation of a spinning body. This sensing of transverse angular velocity or nutation has been accomplished in the past by the use of rate gyros. A particular advantage afforded by the present invention is the relative simplicity and low cost of the device as compared to the more complex and expensive rate gyros.

In accordance with the invention, an asymmetric sensing member having dissimilar moments of inertia about at least two of the three mutually perpendicular axes thereof is pivotally mounted on the spinning body such that the three reference axes are fixed in the body and constrained to rotate therewith. In a specific embodiment, an accurately balanced rectangular bar may be mounted on low friction center pivots which are fixed to the spinning body. The bar is mounted on the pivots such that the pivot axis is perpendicular to the logitudinal axis of the bar. So mounted, the sensing member may be analyzed as regards angular velocities and rates by means of the well known Euler equation which expresses the constraint torques applied to the bar as a function of the angular accelerations and rates along the reference axes. The magnitude of these torques can, thus, be related to the magnitude of the transverse angular velocity vector of the body. The particular relationship is, of course, dependent upon the mounting orientation of the sensing member on the spinning body. More than one mounting position is possible. But in general, according to Euler's equation, the torque about the pivot axis is related to the moments of inertia about the various axes, the acceleration about the pivot axis and the angular rates about the other two axes. The transverse angular velocity vector may lie between the rate vectors and thus be related thereto by a trigonometric function. Thus, the transverse angular velocity can be measured as a function of torque measured about the pivot axis of the sensing member.

Various techniques are available for measuring the torque exerted on a body. In a preferred form, the subject device employs the force balance principle of mass restraint. According to this principle the inertial force of a mass is opposed by a restraining force which tends to maintain the mass in a reference position. The energy expended in generating the restraining force necessary to maintain the reference position provides a direct indication of the inertial force. Thus, in the present invention the displacement of the sensing member about the pivot axis, which is the only displacement possible, is sensed by displacement signal generating pickoff means and converted to a signal of a character which corresponds to the degree of displacement. This signal is, in turn, applied to force producing means, such as an electromagnet, in such a manner as to return the sensing member to the reference position. The energy expended in the restraining means can be made to be a linear function of the torque about the pivot axis and thus provide an accurate indication of the angular rate sought to be measured.

As stated, the torque about the pivot axis, which is sensed by the sensing member, is related to an angular acceleration about the pivot axis, as well as angular rate terms about the other axes. To increase the sensor accuracy, this acceleration term is compensated for, in accordance with the invention, by means of an angular accelerometer. This accelerometer may, for example, consist of a symmetric bar; that is, a bar having equal moments of inertia about the two non-pivotal axes, pivotally mounted on the body in such a way that the torque about the pivot axis is directly proportional to the acceleration about the pivot axis of the sensing member. The signal produced by the accelerometer may be combined with the signal from the sensing member to provide a resulting signal which is an accurate indication of transverse angular velocity sought to be measured.

In the preferred form of the invention, the output signal from the accelerometer is made compatible with the output signal of the sensing member by employing similar mass restraint principles to provide a signal proportional to the accelerometer term. Accordingly, a direct addition or substraction of the accelerometer term can be made.

The invention, as well as the operation thereof, may be better understood upon reference to the following specification which describes an illustrative embodiment of the invention, taken with the accompanying drawings of which:

Figure 1:
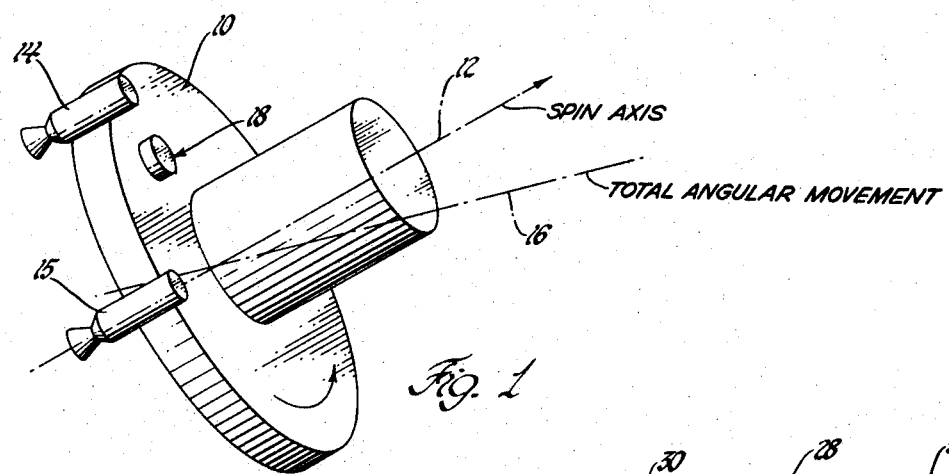
FIGURE 1 shows a spin stabilized vehicle with the invention mounted thereon.

Referring now to FIGURE 1, there is shown a spin-stabilized vehicle 10 having a spin axis 12 which is normal to the vehicle 10 and passes through the center of gravity thereof. Spatial stabilization of a vehicle may be accomplished without the need for a complex control system simply by spinning the vehicle about a maximum moment of intertia axis. Therefore, an active control system will be required only to maintain the appropriate orientation of the vehicle spin axis. Considering the vehicle 10 shown in FIGURE 1, it is well known that such a vehicle spinning about a maximum moment of inertia axis tends to act as a gyroscope when external forces are applied. Thus, if a force is applied to the vehicle 10 by means of a reaction jet 14 mounted on the periphery of the vehicle, a transverse torque is applied to the vehicle. This torque has the effect of shifting the total angular momentum vector of the vehicle 10 away from the spin axis 12 to an axis 16 which is not normal to the primary plane of the vehicle 10. To conserve the magnitude and direction of the new angular momentum vector, the spin axis 12 gradually develops a rotational movement which describes a cone, the axis of which is the total angular momentum vector which is directed along axis 16 shown in FIGURE 1. This rotational motion of the spin axis is described as nutation as in the classical case of a torque-free gyroscope.

By means of the subject transverse angular velocity sensor, which is mounted on the vehicle 10 as indicated at 18, it is possible to detect the transverse angular velocity or nutation of the vehicle 10, and by means such as a second reaction jet 15, it is possible to compensate for this nutation or to employ it in an attitude changing technique as the particular circumstances require.

As previously stated, the specific embodiment of the sensor 18 described herein employs a torsional pendulous type mechanism in which the force-balance principle of pendulum restraint is applied. According to this principle, a sensing member is mounted in a predefined orientation on the vehicle 10 such that rotational torques are set up in the member which are related to the transverse angular velocity of the body 10. These torques tend to rotate the member. The displacement caused by such rotation is sensed by a capacitive pickoff which may be employed in combination with circuitry to provide a signal proportional to the displacement. This signal generates a voltage which is applied to a force producing element in such a polarity as to generate a force counteracting the original nutation force. The current or power supplied to the force producing element is then a linear function of the nutation. A specific mechanism for accomplishing the above-outlined procedure is shown in FIGURE 2.

Figure 2:
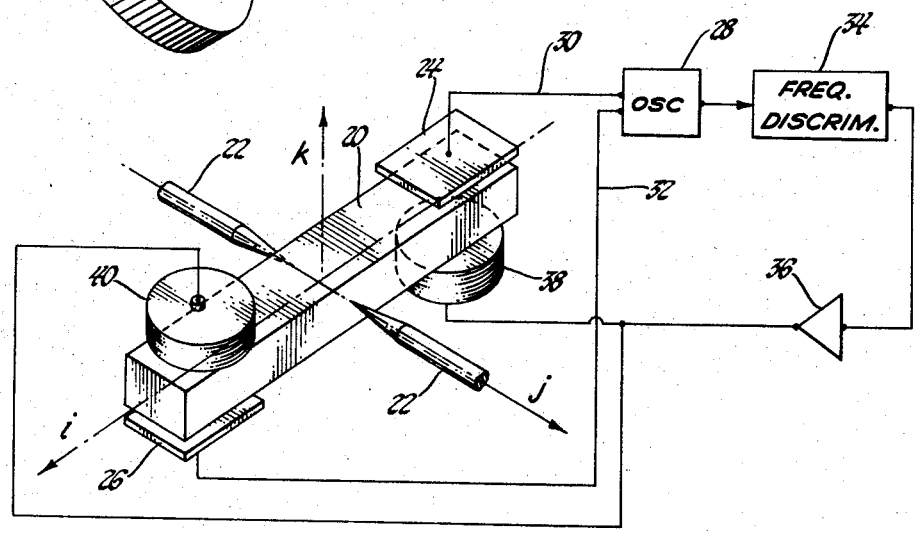
FIGURE 2 is a schematic diagram of a specific embodiment of the invention.

Referring more specifically to FIGURE 2, the sensor is shown to include a sensing member 20 in the form of an asymmetric metal bar. The bar is shown to have three mutually perpendicular axes, $i$, $j$ and $k$, of which the $i$ axis is the longitudinal axis of the bar and the $j$ and $k$ axes are the lateral axes of the bar. In accordance with the invention, the bar 20 is asymmetric having unequal moments of inertia about the two non-pivotal axes, $i$ and $k$. The asymmetrical bar 20 is rotatably mounted on the vehicle 10 shown in FIGURE 1 by means of central pivots 22 which are aligned with the $j$ axis of the bar 20. It is to be understood that the pivotal mounting shown in the drawings is merely representative in nature. To fully describe the orientation of the bar 20 with respect to the spinning vehicle 10 shown in FIGURE 1, it is assumed that the $k$ axis of the bar 20 is parallel to the spin axis 12 of the vehicle 10. In addition, the pivot axis or $j$ axis of the body is aligned normal to the spin axis. Since the $i$, $j$ and $k$ axes are fixed in the spinning body 10 and are constrained to rotate therewith, the well known Euler equations express the torques applied to the bar 20 as a function of the angular acceleration and rates along the three reference axes. According to the Euler equation, and with reference to the coordinate ares shown in FIGURE 2A:

$$B\dot{\omega}_2 - (C-A)\omega_3\omega_1 = L_2 \qquad (1)$$

where, $L_2$ equals torque about the $j$ or pivotal axis;
$\dot{\omega}_2$ equals angular acceleration about the $j$ axis;
$\omega_3$ equals angular rate about the $k$ axis;
$\omega_1$ equals angular rate about the $i$ axis;
$A$ equals the moment of inertia of the bar about the $i$ axis;
$B$ equals moment of inertia about the $j$ axis; and
$C$ equals moment of inertia of the bar about the $k$ axis.

Figure 2A:
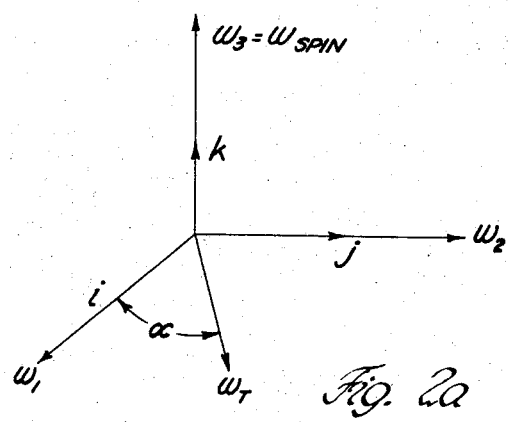
FIGURE 2A is a representation of the coordinate axes referred to in the explanation of the invention shown in FIGURE 2.

Assuming that the transverse angular velocity vector $\omega_T$ is as shown in FIGURE 2A to be in the plane of the $i$ and $j$ axes, and rotated counterclockwise from the $i$ axis through an angle $\alpha$, the torque applied to the bar 20 about the pivotal axis is proportional to the total transverse angular velocity of the body $\omega_T$ times the cosine of the angle $\alpha$. Thus, the torque about the $j$ axis is a function of the angular acceleration about that axis and also of the transverse angular velocity of the body 10. This torque tends to rotate the pivotally mounted body 20 about the $j$ axis. In accordance with the invention, the torque is sensed by means of a displacement pickoff and a mass restraining or force producing means as further described in the following.

The displacement pickoff is, in the present instance, a capacitive type pickoff which includes a pair of plates 24 and 26 mounted adjacent opposite ends of the bar 20. Mounting means for the various components are omitted from the drawing for simplicity, but various techniques will be apparent to those skilled in the art. In this system, the bar 20 forms one plate of each of two variable capacitors completed by plates 24 and 26. The respective distances between the bar 20 and the two plates 24 and 26 provide a signal proportional to capacitance change, which change is proportional to the torque about the $j$ axis. The capacitors formed as above are part of a tuning circuit for an oscillator 28 and are connected therewith by means of representative conductors 30 and 32. The change in capacitance caused by rotation of the bar 20 alters the frequency normally generated by the oscillator 28. This frequency change is sensed by means of a discriminator 34 which is connected to receive the output of the oscillator 28. The frequency discriminator 34 provides a DC signal which is proportional to the frequency change in the output of the oscillator 28. The DC signal from the discriminator 34 is amplified at 36 and applied to a force producing system in the form of two electromagnets 38 and 40. The electromagnets 38 and 40 are responsive to the amount of current supplied thereto to restrain the angular displacement of the bar 20 and retain it in a neutral position where the gaps between the bar 20 and plates 24 and 26 are equal. The amount of energy which is required to maintain the bar 20 in the neutral or reference position is a function of the torque caused by the angular transverse velocity of the vehicle 10. Due to the shift of the total angular momentum vector described with reference to FIGURE 1, the peak torque output from the asymmetrical sensor bar 20 shown in FIGURE 2 is a cosinusoidal signal with the peak amplitude proportional to the magnitude of the transverse angular rate $\omega_T$ and the acceleration about the $j$ axis. It is to be understood that the displacement pickoff and force producing means shown in FIGURE 2 are representative of specific means of carrying out the objects of the invention are not to be construed in a limiting sense. For example, it may be desirable to mount the coil portions of the force producing means on the bar 20 in which case current may be supplied thereto across the pivot means by small conducting springs.

Figure 3:
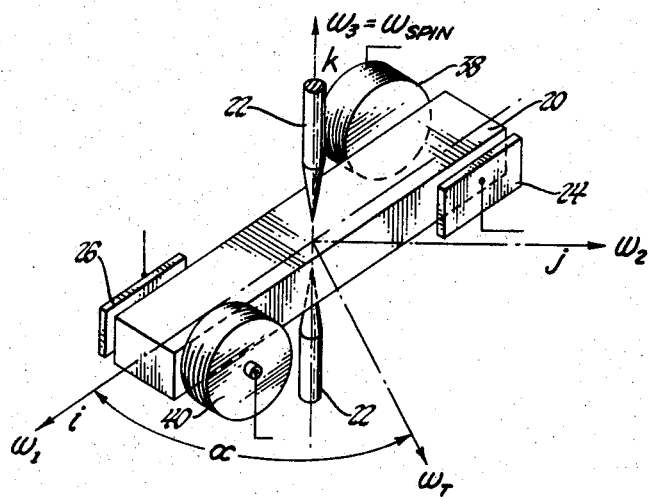
FIGURE 3 shows an alternative embodiment of the invention.

The sensor bar 20 can alternatively be mounted on the vehicle 10 with the pivot axis aligned parallel to the spin axis 12 of the vehicle 10 as shown in FIGURE 3. In this position, the torque $L_3$ applied about the pivot axis which is the $k$ axis can be expressed as follows:

$$C\dot{\omega}_3 - (A-B)\omega_1\omega_2 = L_3 \qquad (2)$$

In this upright position, the peak amplitude of the output signal waveform, which may be generated by means of displacement pickoff and mass restraint means as shown in FIGURE 2, is proportional to the square of the transverse angular velocity $\omega_T$ and the acceleration about the $k$ axis.

As discussed above, the sensor bar 20 provides an indication of transverse velocity via a signal which contains an acceleration term. To increase the accuracy of the torque measurement, it is desirable to compensate for the acceleration term. This may be accomplished by means of a conventional accelerometer device mounted on the vehicle 10 for providing a signal which is related to the acceleration of the bar 20 about the pivot axes shown in FIGURES 2 and 3. By subtracting the acceleration signal from the torque output of the sensor arrangement of FIGURE 2 or 3, the net signal is a cosinusoidal signal with the peak amplitude proportional to the magnitude of only the transverse angular rate $\omega_T$.

Figure 4:
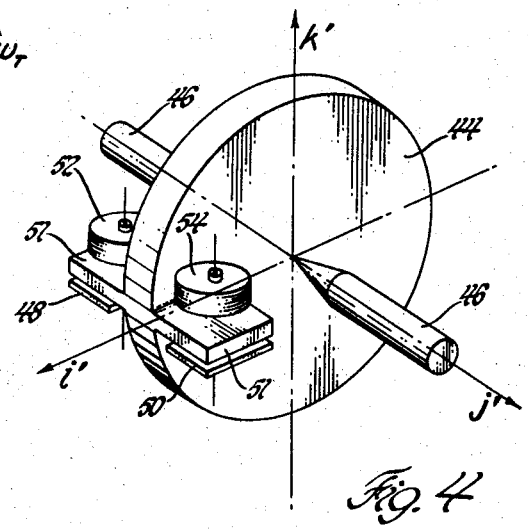
FIGURE 4 is a representation of an accelerometer device for use in combination with the present invention.

FIGURE 4 illustrates a specific apparatus which may be used to provide a signal proportional to the acceleration term which is compatible with the signal output of the apparatus shown in FIGURE 2. In FIGURE 4, the apparatus consists of a symmetric bar 44 having three mutually perpendicular axes $i'$, $j'$ and $k'$ passing through the center of gravity thereof. The bar 44 is disc-shaped and, thus, has equal moments of inertia about the $i'$ and $k'$ axes. The symmetric bar 44 is mounted on the vehicle 10 by means of central pivots 46 such that the pivot axis $j'$ corresponds with the pivot axis $j$ of the asymmetric bar shown in FIGURE 2. The accelerometer system shown in FIGURE 4 is further provided with capacitive pickoff plates 48 and 50 mounted adjacent small projecting wings 51 for the purpose of providing displacement signals. Force producing means in the form of electromagnets 52 and 54 are provided for maintaining the bar 44 in a reference position. Thus, the previously outlined principle of mass restraint is also applied to the accelerometer. Although not shown in full, it is to be understood that the accelerometer includes the signal generating circuitry disclosed in FIGURE 2. The only difference between the symmetric bar arrangement of FIGURE 4 and the asymmetric bar arrangement of FIGURE 2 is that the moments of inertia about the $i'$ and $k'$ axes are equal, whereas in the asymmetric bar 20 of FIGURE 2, the moments about the $i$ and $k$ axes are dissimilar. Referring to the Equation 1, it can be seen that when the C and A terms are equal, the torque about the pivot axis is proportional only to the acceleration term $\ddot{\omega}_2$. Therefore, the output of a mass restraint system operating, in cooperation with the symmetric sensor bar shown in FIGURE 4, provides an output signal which is proportional to acceleration, and which is further compatible with the output signal from the FIGURE 2 system. Accordingly, the acceleration signal may be subtracted by means of conventional circuitry from the output signal of the FIGURE 2 system to yield a signal quantity which is accurately related to transverse angular velocity.

It will be apparent to those skilled in the art that the requirement for equal moments of inertia about the two non-pivotal axes of the accelerometer member can be met by members of various symmetric shapes mounted for rotation about a normal axis passing through the center of gravity. The requirement to be met is that the member must possess equal moments of inertia about the two non-pivotal axes such that the output is indicative of the magnitude of a pure acceleration term to be subtracted from the output of the system of FIGURE 2 or 3. It is also clear that the particular structural details of the FIGURE 4 accelerometer are subject to various modifications.

Figure 5:
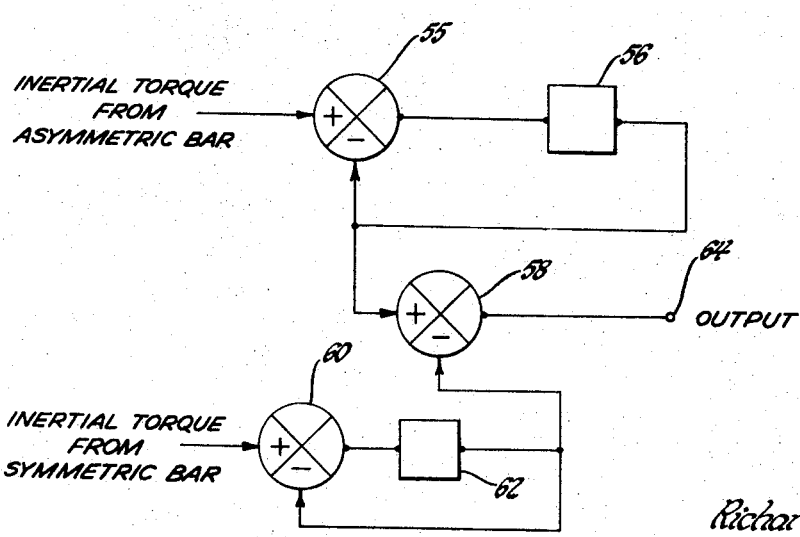
FIGURE 5 is a schematic diagram of the signal circuit employed in combination with the invention to interpret the output signals therefrom.

FIGURE 5 is illustrative of a circuit arrangement for accomplishing the aforementioned subtraction of the acceleration term from the output signal of the system shown in FIGURE 2. In accordance with the objective of the invention, the inertial torque from the asymmetric bar 20 of FIGURE 2 forms the input to a comparator 55 which is representative of the combination of the capacitive pickoff including plates 24 and 26 and the force producing means including electromagnets 38 and 40. This combination is effectively a comparator as indicated in FIGURE 5. The output from the comparator 55 enters block 56 which is representative of the combination of oscillator 28, frequency discriminator 34 and amplifier 36 of FIGURE 2. The output from this block which is the restraining torque signal is returned to the comparator 55 for purposes of maintaining bar 20 in the reference position. In addition, the restraining torque signal which is delivered to the comparator 55 is also delivered as one input to a second comparator 58. The other input to the comparator is a torque signal related to acceleration and is provided by means of the accelerometer arrangement shown in FIGURE 4. This accelerometer arrangement is illustrated in FIGURE 5 as the combination of a torque comparator 60 which represents the capacitive pickoff including plates 48 and 50 of the symmetric sensor bar 44 shown in FIGURE 4 and the force restraining means which are required to maintain the symmetric bar in the reference position. The compared output signal is fed to a circuit indicated at 62. This circuit consists, again, of a combination of an oscillator, frequency discriminator and amplifier which is effective to provide the second torque signal input to comparator 58.

In accordance with the previous description, it can be seen that the first input to comparator 58 consists of the torque signal derived from the asymmetric sensor bar shown in FIGURE 2 which includes both velocity and acceleration terms. The second input to the comparator 56 consists of the torque signal from the symmetric sensor bar shown in FIGURE 4 which includes only an acceleration term. Therefore, the combined output which appears at terminal 64 represents the transverse angular velocity sought to be measured.

While a specific example of the invention has been described, it will be apparent to those skilled in the art that various modifications and additions to the system as presented herein are possible. For example, it may be desirable to provide an electrical dither for alleviating frictional problems in the rotational mounting for the sensing bar. In addition, various circuit combinations are possible to accomplish the desired objective of the invention. A definition of the invention may be had by reference to the appended claims.

What is claimed is:

1. Apparatus for measuring the angular velocity of a spin-stabilized body transverse to the spin axis thereof comprising: an asymmetric sensing member having three mutually perpendicular axes including a longitudinal axis and two lateral axes passing through the center of gravity thereof, the member being pivotally mounted on the body for rotation relative to the body about one of the lateral axes, said one of the axes bearing a known relation to the spin axis, the member having dissimilar moments of inertia about the two non-pivotal axes, means for providing a signal related to the angular displacement of the member about the pivotal axis as a result of angular velocity of the body transverse to the spin axis thereof, and means connected to receive the signal and responsive thereto to restrain rotation of the member about said one axis.

2. Apparatus for measuring angular velocity of a spin-stabilized body transverse to the spin axis thereof comprising: an asymmetric bar pivotally mounted on the body for rotation about a lateral axis which passes through the center of gravity of the bar, the bar having dissimilar moments of inertia about two axes mutually perpendicular to the lateral axis, the lateral axis being aligned parallel to the spin axis, means for sensing angular displacement of the bar about the lateral axis thereof caused by transverse angular velocity of the body and for producing a signal related to the magnitude of the displacement, force producing means connected to receive the signal and responsive to the signal to restrain the displacement, and means to indicate the force required to maintain the bar in a reference position.

3. Apparatus for measuring transverse angular velocity of a body having a spin axis comprising: an asymmetric bar having dissimilar moments of inertia about the mutually perpendicular lateral and longitudinal axes thereof, the bar being mounted on the body for rotation about the lateral axis passing through the center of gravity of the bar and normal to the spin axis of the body and means for measuring the torque on the bar about the lateral axis produced by transverse angular velocity of the body.

4. Apparatus for measuring transverse angular velocity of a body having a spin axis comprising: an asymmetric bar pivotally mounted on the body for rotation about a lateral axis passing through the center of gravity of the bar and normal to the spin axis of the body, the asymmetric bar having dissimilar moments of inertia about the two orthogonal axes which are mutually perpendicular to the lateral axis, means for sensing angular displacement of the bar about the lateral axis from a reference position due to transverse angular velocity of the body and for producing an output signal related to the magnitude of the displacement, force producing means connected to receive the output signal and to produce a force tending to restrain rotation of the bar, means to produce a first signal quantity related to the force produced by the force producing means, accelerometer means mounted on the body for producing a second signal quantity related to the angular acceleration of the bar about the lateral axis thereof, and means for combining the first and second signal quantities to produce a third signal quantity related to the difference therebetween.

5. A nutation sensor for a body having a spin axis comprising: an asymmetric sensing member having a longitudinal and two lateral axes which are mutually perpendicular and which pass through the center of gravity of the member, the asymmetric member being mounted on the body for rotation about a lateral axis which bears a known angular relation to the spin axis, the asymmetric member having dissimilar moments of inertia about the two nonrotative axes thereof, a symmetric sensing member having a longitudinal and two lateral mutually perpendicular axes passing through the center of gravity thereof, the symmetric sensing member being mounted on the body for rotation about a lateral axis corresponding to the axis of rotation of the asymmetric member, the symmetric member having similar moments of inertia about the two nonrotative axes, means for producing a first signal quantity related to the torque produced about the axis of rotation of the asymmetric member, means for producing a second signal quantity related to the torque produced about the axis of rotation of the symmetric member, and means for combining the first and second signal quantities to provide a third signal quantity related to the transverse angular velocity of the body.

6. A nutation sensor for sensing transverse angular velocity of a body which is rotating about a spin axis comprising: an asymmetric bar mounted on the body for rotation about a lateral axis passing through the center of gravity of the bar and normal to the spin axis of the body, means for measuring the torque exerted on the bar about the lateral axis and for producing a first signal quantity related thereto, accelerometer means mounted on the body for measuring angular acceleration thereof about the lateral axis of the asymmetric bar and for producing a second signal quantity related thereto, and means for receiving the first and second signal quantities and for producing a third signal quantity related to the difference therebetween.

References Cited

UNITED STATES PATENTS

| | | | |
|---|---|---|---|
| 2,310,213 | 2/1943 | Buchanan | 73—514 X |
| 3,052,127 | 9/1962 | De Mott | 73—517 |
| 3,189,299 | 6/1965 | Garner et al. | 244—155 |

FOREIGN PATENTS 854,360  11/1960  Great Britain.

JAMES J. GILL, *Primary Examiner.*